United States Patent
Winters

(10) Patent No.: US 11,651,420 B1
(45) Date of Patent: May 16, 2023

(54) RESTAURANT CONTROL PROCESS

(71) Applicant: Bronson Winters, Greeneville, TN (US)

(72) Inventor: Bronson Winters, Greeneville, TN (US)

(*) Notice: Subject to any disclaimer, the term of this patent is extended or adjusted under 35 U.S.C. 154(b) by 0 days.

(21) Appl. No.: 17/034,135

(22) Filed: Sep. 28, 2020

Related U.S. Application Data

(60) Provisional application No. 62/906,334, filed on Sep. 26, 2019.

(51) Int. Cl.
*G06Q 30/06* (2012.01)
*H04W 4/021* (2018.01)
(Continued)

(52) U.S. Cl.
CPC ......... *G06Q 30/0641* (2013.01); *G06Q 10/02* (2013.01); *G06Q 20/202* (2013.01);
(Continued)

(58) Field of Classification Search
CPC ..... G06Q 30/0601–0645; G06Q 50/12; G06Q 10/02
(Continued)

(56) References Cited

U.S. PATENT DOCUMENTS 7,069,228 B1 * 6/2006 Rose .................... G06Q 10/109
 705/5
8,498,900 B1 7/2013 Spirin et al.
(Continued)

FOREIGN PATENT DOCUMENTS

CN 107622456 1/2018
CN 109359754 2/2019
(Continued)

OTHER PUBLICATIONS

Lakshmi, BM et. al. "Impact of COVID 19 on the Restaurants" (Aug. 2020) Journal of Interdisciplinary Cycle Research. (Year: 2020).*
(Continued)

*Primary Examiner* — Allison G Wood
*Assistant Examiner* — Katherine A Barlow
(74) *Attorney, Agent, or Firm* — Pitts & Lake, P.C.

(57) ABSTRACT

A customer relations management system for streamlined dining experiences comprising: a software application configured to be used by restaurants that collects the data regarding customer dining experiences; a database for storing the data regarding customer dining experiences; a user interface configured for use on a mobile device of a restaurant customer which provides selections for restaurant choices and customer preferences and live video communication with a virtual staff member (for ordering inside or outside the restaurant building); a mobile application (tablet, phone) of a restaurant manager or staff which tracks customer time/distance from restaurant, enables table assignments, and provides an interaction with customers through live video/text with the virtual staff member; a smart watch application that enables communication between the staff member and the customer, a data processor which performs analytics on the data stored during the customer dining experiences.

4 Claims, 17 Drawing Sheets

(51) Int. Cl.
*G06Q 10/02* (2012.01)
*G06Q 50/12* (2012.01)
*G06Q 20/20* (2012.01)
*G06Q 30/0601* (2023.01)
*G06Q 30/02* (2012.01)
*G06Q 30/0282* (2023.01)

(52) U.S. Cl.
CPC ............ *G06Q 50/12* (2013.01); *H04W 4/021* (2013.01); *G06Q 30/0282* (2013.01)

(58) Field of Classification Search
USPC .............................................. 705/26.1–27.2
See application file for complete search history.

(56) References Cited

U.S. PATENT DOCUMENTS

| | | | |
|---|---|---|---|
| 8,583,511 B2* | 11/2013 | Hendrickson | H04L 67/52 705/14.65 |
| 9,384,505 B1* | 7/2016 | Cao | G06Q 30/0633 |
| 9,390,424 B2* | 7/2016 | Hendrickson | G06Q 30/0271 |
| 9,721,314 B2* | 8/2017 | Rose | G06Q 30/0226 |
| 10,152,680 B1* | 12/2018 | Myrick | G06Q 20/102 |
| 10,311,475 B2 | 6/2019 | Yuasa | |
| 2004/0034537 A1 | 2/2004 | Gengarella et al. | |
| 2005/0267787 A1 | 12/2005 | Rose et al. | |
| 2008/0228532 A1 | 9/2008 | Gengarella et al. | |
| 2008/0270230 A1 | 10/2008 | Hendrickson et al. | |
| 2009/0313053 A1 | 12/2009 | Gengarella et al. | |
| 2012/0016745 A1 | 1/2012 | Hendrickson | |
| 2014/0025540 A1 | 1/2014 | Hendrickson | |
| 2014/0122148 A1 | 5/2014 | Padgett | |
| 2014/0149234 A1 | 5/2014 | Neubardt | |
| 2014/0156319 A1* | 6/2014 | Deeb | G06Q 30/06 705/5 |
| 2014/0229099 A1 | 8/2014 | Garrett | |
| 2014/0257877 A1 | 9/2014 | L'Heureux et al. | |
| 2014/0279123 A1* | 9/2014 | Harkey | G06Q 30/0619 705/26.1 |
| 2014/0308977 A1* | 10/2014 | Cheung | H04L 67/18 455/456.3 |
| 2014/0310030 A1 | 10/2014 | Cheranda | |
| 2015/0046199 A1 | 2/2015 | Arthurs | |
| 2015/0127394 A1 | 5/2015 | Hogan | |
| 2015/0178731 A1 | 6/2015 | Irizari | |
| 2015/0348049 A1* | 12/2015 | Todasco | G06Q 10/02 705/5 |
| 2016/0094944 A1* | 3/2016 | Kong | H04W 4/022 455/456.1 |
| 2016/0117612 A1 | 4/2016 | Hong et al. | |
| 2016/0171584 A1 | 6/2016 | Cao | |
| 2016/0232624 A1 | 8/2016 | Goldberg et al. | |
| 2016/0275597 A1 | 9/2016 | Ueda | |
| 2016/0350818 A1* | 12/2016 | Saeed | G06Q 30/0282 |
| 2017/0213160 A1 | 7/2017 | Yerli | |
| 2018/0089709 A1* | 3/2018 | Rousseau-Villella | G06F 16/9535 |
| 2018/0144420 A1 | 5/2018 | Lee | |
| 2018/0374169 A1 | 12/2018 | Videnovic | |
| 2019/0034989 A1 | 1/2019 | Hendrickson | |
| 2020/0364772 A1* | 11/2020 | Scholl | G06Q 20/202 |

FOREIGN PATENT DOCUMENTS

| | | |
|---|---|---|
| JP | 2003108643 A | 4/2003 |
| JP | 2012042996 A | 3/2012 |
| JP | 2015041339 A | 3/2015 |
| KR | 19980041808 | 8/1998 |
| KR | 101417870 B1 | 7/2014 |
| KR | 2014014300 A | 12/2014 |
| WO | WO2008134352 A1 | 11/2008 |
| WO | WO2015023713 A2 | 4/2015 |
| WO | WO2016065347 A1 | 4/2016 |
| WO | WO2018236209 A3 | 12/2018 |

OTHER PUBLICATIONS

Furtula, Aleksandar et. al. "Hello and welcome: Robot waiters to the rescue amid virus" ABCNews.com (Year: 2020).*
Lalley, Heather. "Panera Adds Geofencing to Curbside Pickup" RestaurantBusinessOnline.com (Year: 2020).*
Bairstow, David. "Geofencing Can Minimize Face-to-Face Interactions in Restaurants" QSRMagazine.com (Year: 2020).*
Bhalla, Kritti. "Zomato, Dineout Explore Contactless Dining For Life After Covid-19 Lockdowns" Inc42.com (Year: 2020).*

* cited by examiner

RESTAURANT CONTROL PROCESS

CROSS-REFERENCE TO RELATED APPLICATIONS

This application claims the benefit of U.S. Provisional Application No. 62/906,334, filed on Sep. 26, 2019.

BACKGROUND

Providing a system for controlling the processes involved with customer dining experiences to improve the experience for consumer and produce efficiencies and cost-savings for restaurants. For example, a user may be able to communicate with the restaurant to provide them with a profile related to the customer's dietary or other requirements. Waiting time can be minimized for the customer by providing a GPS system that tracks their whereabouts and provides that information to the restaurant, so that the restaurant is prepared for the customer's arrival. Moreover, the addition of a virtual or contactless server can minimize the amount of contact between the servers and customers, thus greatly increasing the possibility of social distancing even while the customer enjoys an indoor dining experience with family or close personal acquaintances. The restaurant may use data analytics on the information gathered during the dining experience to make decisions regarding staffing, food selection, and more. Customers need to communicate personal and historical preferences and dietary requirements. Restaurant management want to know when their customers will arrive and also want to maintain minimal staff while maintaining a high quality of service. Opportunities exist to utilize remote workforces for some restaurant operations (virtual hosts and/or waiting staff), while simultaneously adhere to social distancing regulations when needed. In addition, restaurants owners should be collecting and using data to optimize their business and hiring processes.

Known restaurant systems exist, but have been insufficient to provide all the functionality required to offer the customer a complete dining experience. They do not include robust data collection and communications across these mobile devices, nor do they provide remote/virtual staffing capabilities through live video communication technology. What is required is a comprehensive approach, using up-to-date technology, to manage the process from the time the diner decides to go out up until the meal is complete, and beyond.

SUMMARY OF THE INVENTION

Embodiments of the present general inventive concept provide a customer relations management system for streamlined dining experiences comprising: a software application configured to be used by restaurants that collects the data regarding customer dining experiences; a database for storing the data regarding customer dining experiences; a user interface configured for use on a mobile device of a restaurant customer which provides selections for restaurant choices and customer preferences and live video communication with a virtual staff member (for ordering inside or outside the restaurant building); a mobile application (tablet, phone) of a restaurant manager or staff which tracks customer time/distance from restaurant, enables table assignments, and provides an interaction with customers through live video/text with the virtual staff member; a smart watch application that enables communication between the staff member and the customer, a data processor which performs analytics on the data stored during the customer dining experiences.

Example embodiments of the present general inventive concept can be achieved by providing a customer relations management method for streamlined dining experiences comprising: providing a software application configured to be used by restaurants that collects the data regarding customer dining experiences; storing the data gathered during the customer dining experiences within a database; providing a user interface configured for use on a smart watch or cell phone of a restaurant customer which provides selections for restaurant choices and customer preferences; providing a user interface configured for use on a smart watch or cell phone of a restaurant manager or staff which tracks tables and provides an interaction with customers; tracking the user's physical location after the user checks into a restaurant via their user interface, and communicating that information to the restaurant's software application; providing a charging system for charging the restaurant smart watches; and performing analytics on the data stored during the customer dining experiences.

BRIEF DESCRIPTION OF THE FIGURES

The following example embodiments are representative of exemplary techniques and structures designed to carry out the objectives of the present general inventive concept, but the present general inventive concept is not limited to these example embodiments. A wide variety of additional embodiments will be more readily understood and appreciated through the following detailed description of the exemplary embodiments, with reference to the accompanying drawings in which.

DETAILED DESCRIPTION

Figure 1A:
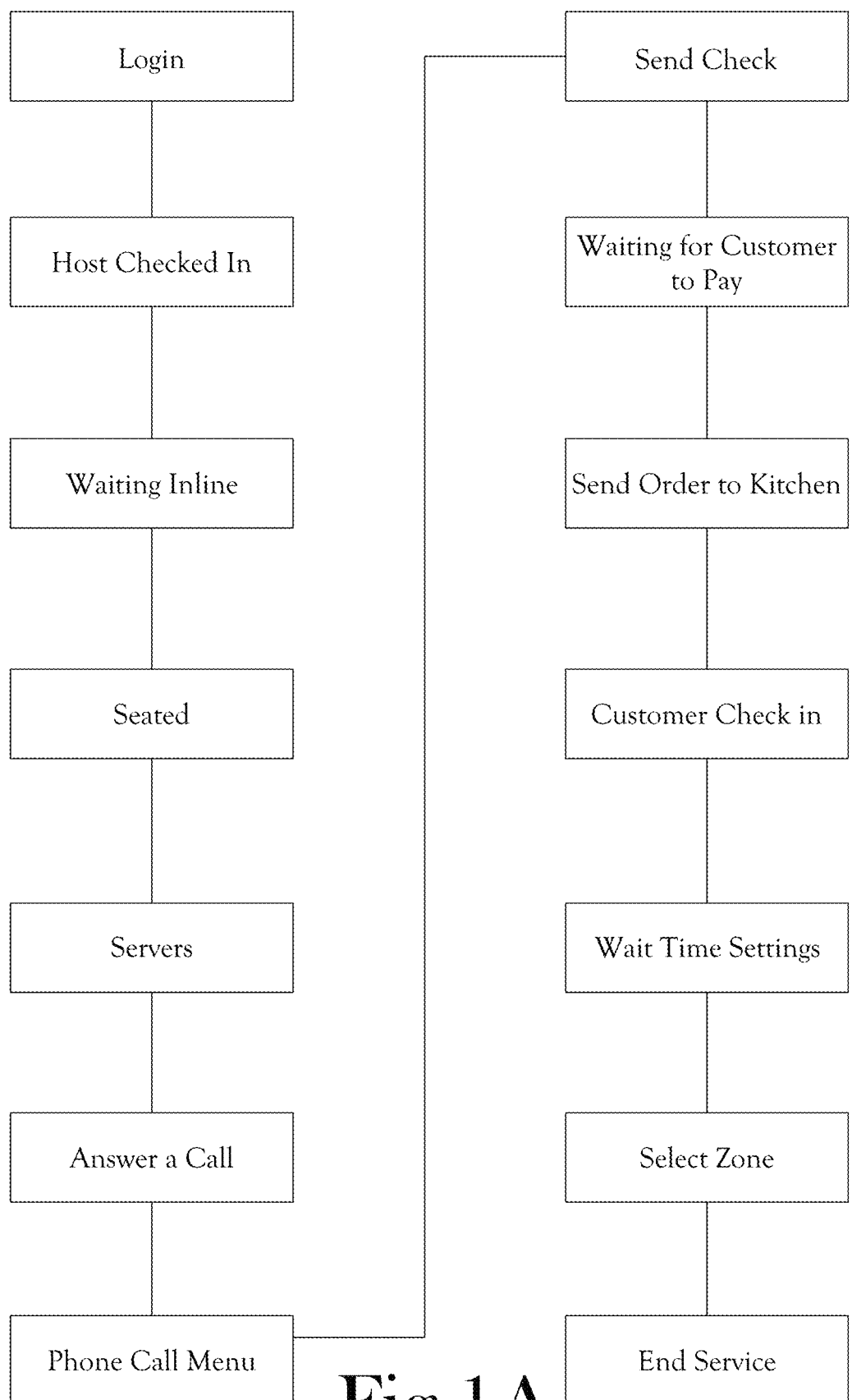
FIG. 1A is a flow chart of the functionality of the Restaurant Control Process according to an example embodiment of the present general inventive concept.
Figure 1B:
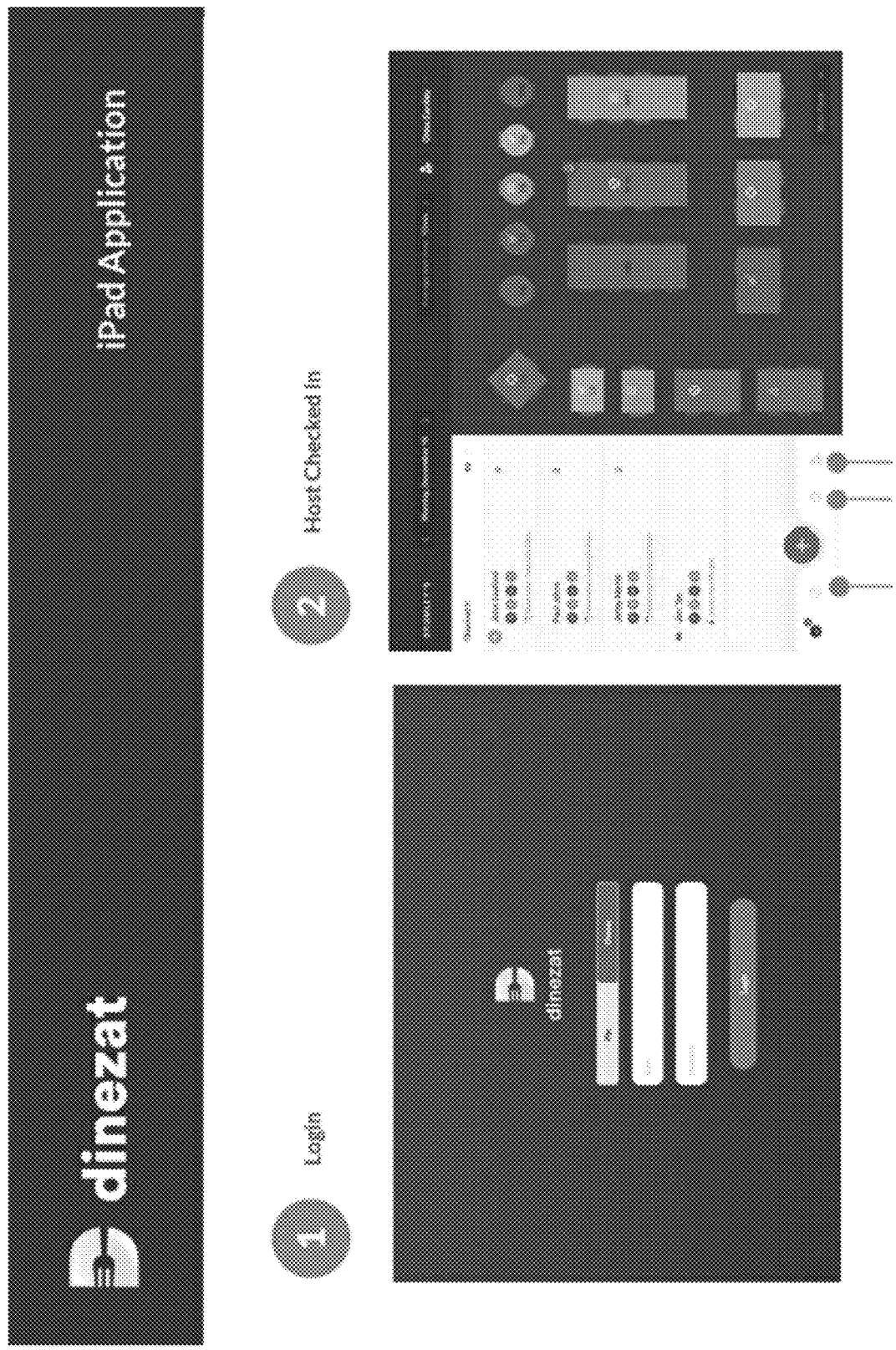
FIGS. 1B-1E show various user interfaces of the Restaurant Control Process according to an example embodiment of the present general inventive concept.
Figure 1C:
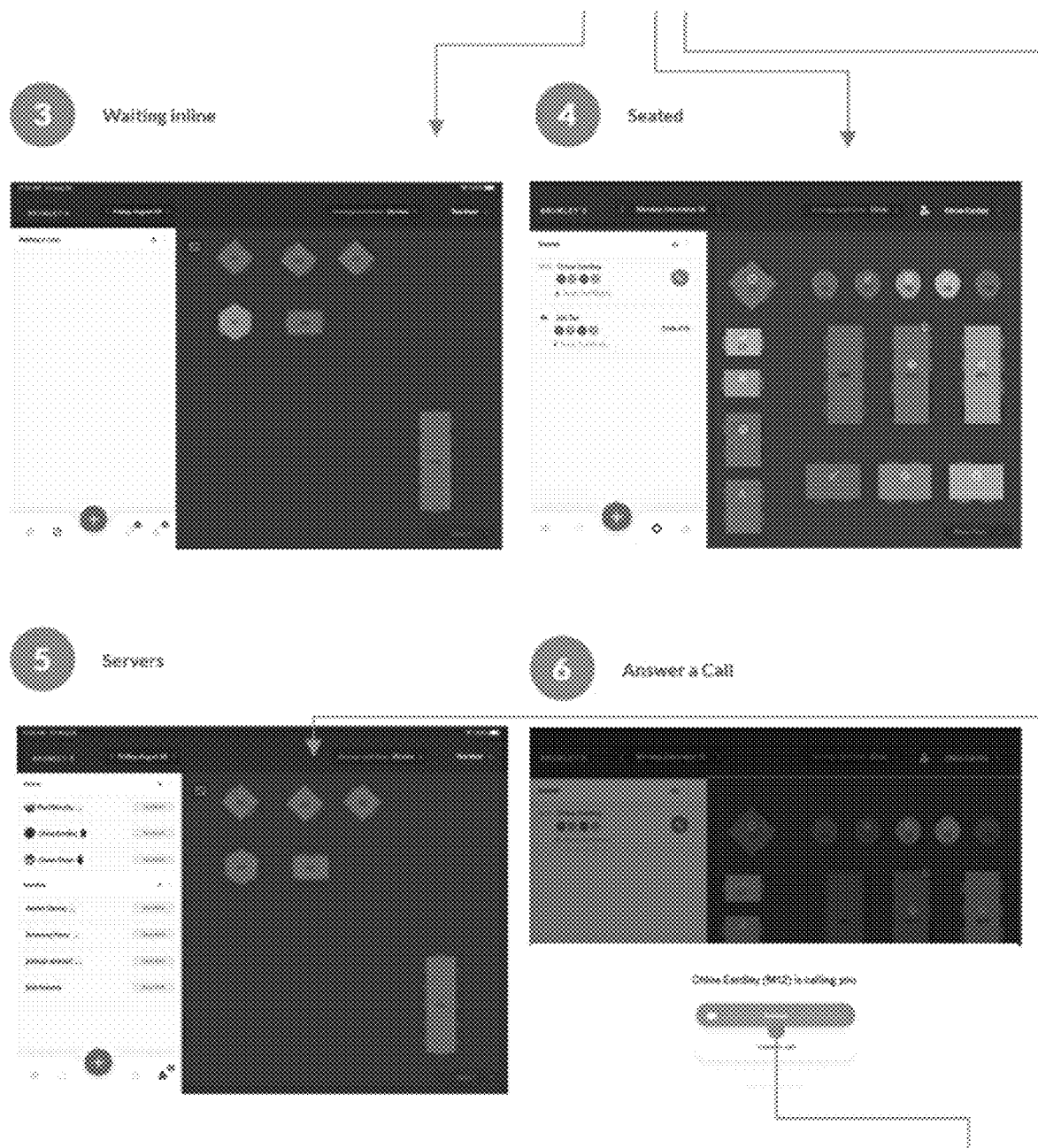
Figure 1D:
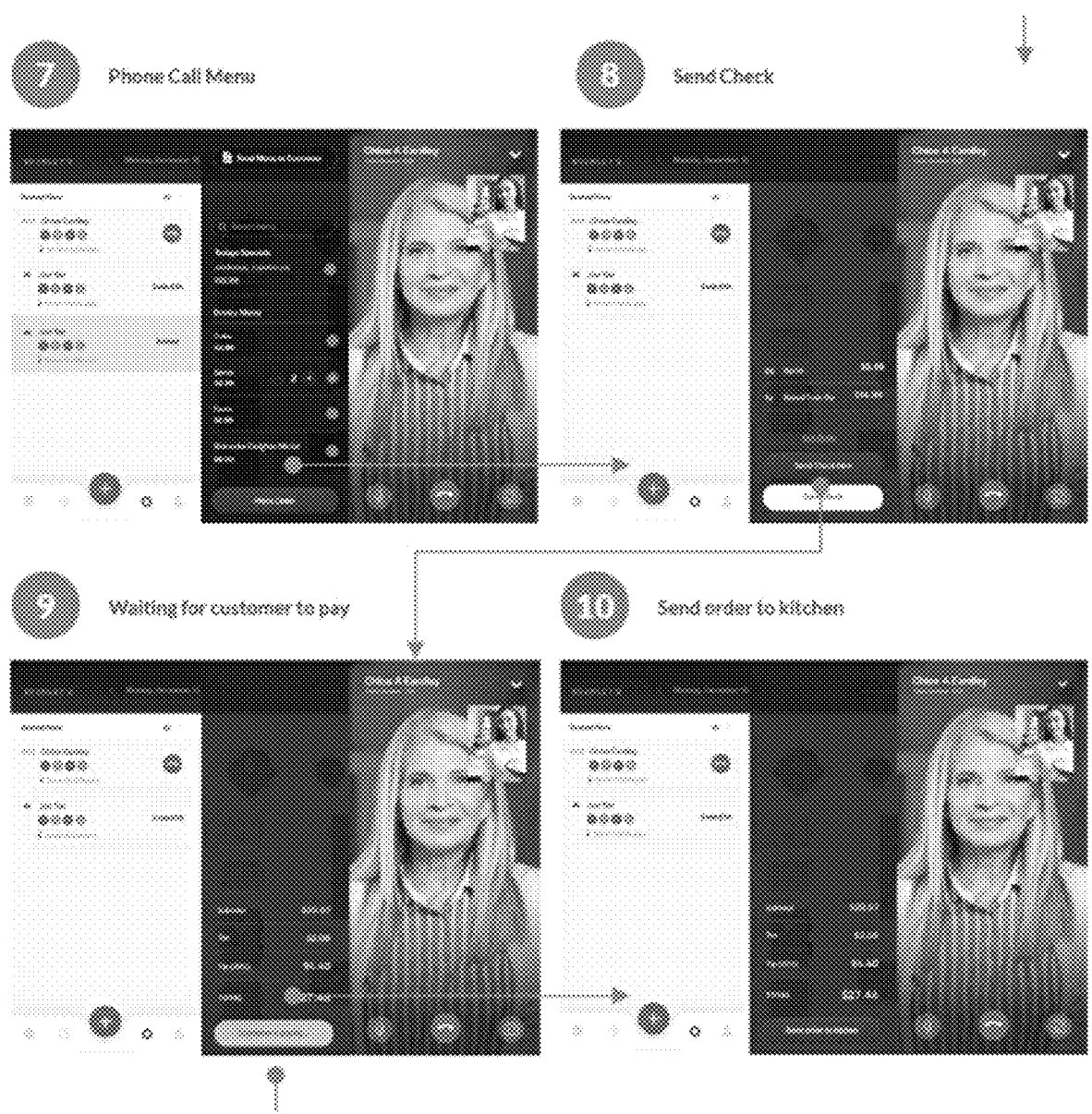
Figure 1E:
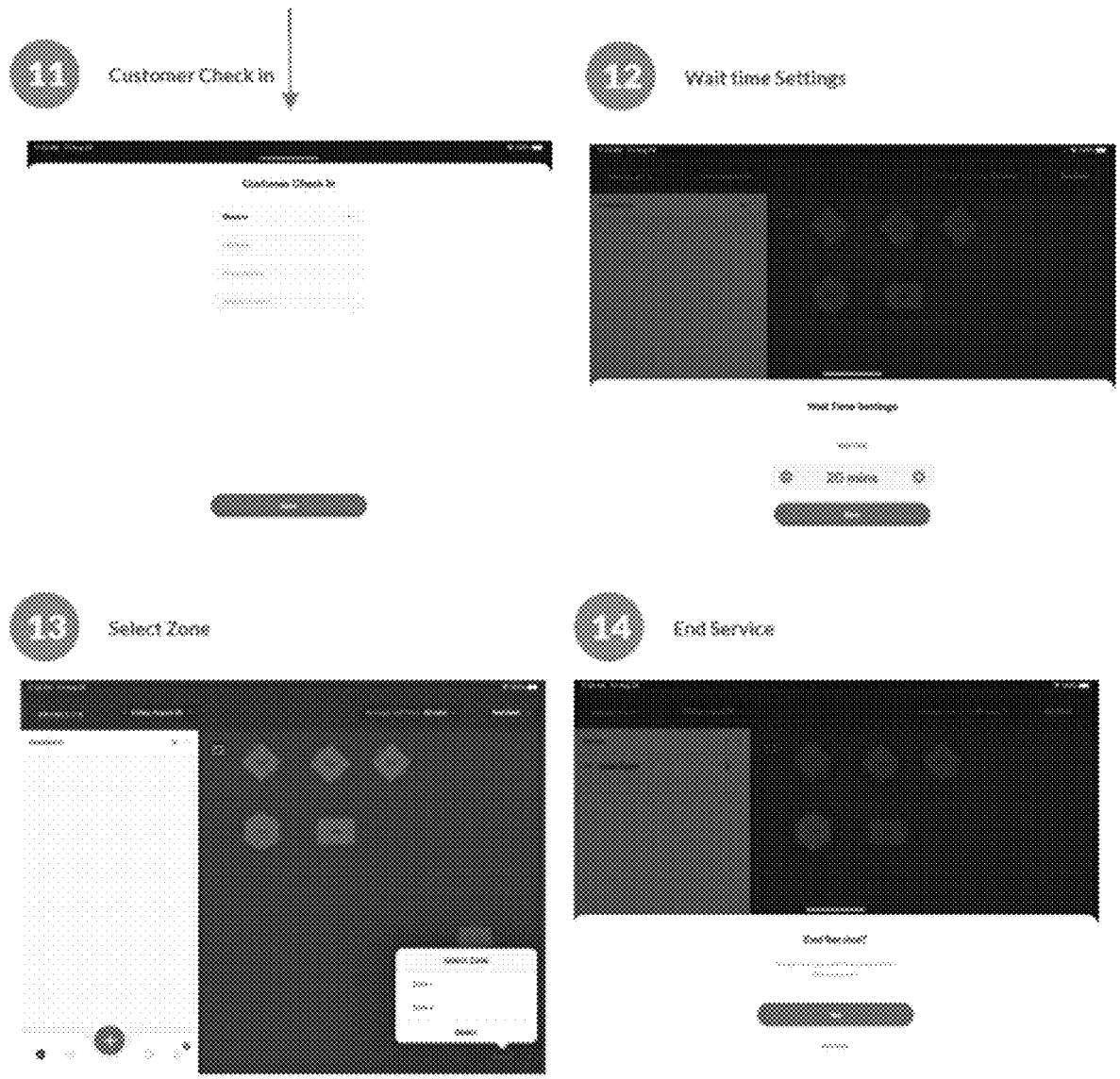

Reference will now be made to the example embodiments of the present general inventive concept, examples of which are illustrated in the accompanying drawing(s) and illustration(s). The example embodiments are described herein in order to explain the present general inventive concept by referring to the figure(s). The following detailed description is provided to assist the reader in gaining a comprehensive understanding of the structures described herein. Accordingly, various changes, modification, and equivalents of the structures and techniques described herein will be suggested to those of ordinary skill in the art. The descriptions are merely examples, however, and the sequence type of operations is not limited to that set forth herein and may be changed as is known in the art, with the exception of operations necessarily occurring in a certain order. Also, description of well-known functions and constructions may be omitted for increased clarity and conciseness.

According to various examples of the present general inventive concept, a personalized dining experience is provided to a restaurant's customers by utilizing an application and user interface on their smart swatch, tablet, or cell phone. The user interface provides all the information needed to make restaurant selection decisions, book a table, select server, view the menu and even order ahead of time if necessary (for in-person dining and to-go dining). The system provides not only profiles for customers, and their friends, so that the staff is aware of their needs, but also profiles for the staff including managers, servers, and waiters. Additionally, the system provides for a virtual or contactless server so that the customer can interact through video communication with server or order-taker without necessarily being in direct contact, while still enjoying a restaurant experience. In one embodiment, a limited number of highly-trained servers may be utilized at the restaurant or remotely from another location, while most or all of the food can be delivered by unskilled food runners. In this way the amount of costly server training can be reduced drastically.

Once the dinner is complete, the customer can leave a review immediately upon completion, or pay the bill from their smart phone. Analagous applications and user interfaces may also be provided to each of the managers, servers, and hosts, so that the restaurant is aware of the customer's location and preferences, and can prepare for their arrival, and best serve them based on the information provided to them from the software application.

The system also stores all the data gathered during the dining experiences and saves it for data analytics on the back end. This information may be used to make decisions regarding staffing and compensation. Additionally, this information can also be used with regard to strategic decision-making regarding expansion plans and franchising opportunities, for example.

By utilizing the customized application, the customer will be able to see in real time the wait times to be seated at a particular restaurant and can make the decision at that time whether to proceed, or consider another location. If they wish to proceed, the customer will be able to book a reservation based on the restaurant's availability. Additionally, the customer will be able to search for restaurants by wait times, and make their dining decision based on these factors.

In other embodiments, once the customer dining decision has been made, the customer will be able to hold their position in a queue. This will notify the restaurant host with the customer's exact location, via GPS, and will provide a general estimated time of arrival on the application. The customer will be provided the option, at check in, with checking in manually with the restaurant host, or the customer can select automatic check in based on their close proximity to the restaurant. Specifically, whenever the customer enters within a set distance or Geo Fence of the restaurant, they will automatically be checked in. In other embodiments, the customer's reservation will lock in, once the customer has arrived within that set distance. The customer may also have a preferred server based on previous visits to the restaurant, and can specifically request that server, based on his/her availability. Additionally, the customer may communicate with a virtual or contactless server both on the way to, and when they arrive.

In other embodiments of the invention, the customer can send out a notification from the application to get the manager's attention. This may be the case, for example, in case of an issue with a server, or with the food, that the customer wishes to address with management. This will trigger a PUSH notification, which will show up on the manager's smart watch. The customer may also send out a notification from the application to get the server's attention, in order to pay the bill, place an order, get additional condiments, etc. This action will trigger a PUSH notification to the server's smart watch and/or the management display.

Shown on the user's smartwatch application may be icons representing a snapshot of the customer's dietary restrictions, for example, gluten-free, vegan, lactose intolerant, etc. These icons may also represent important dates for the wait staff to be aware of, such as birthdays, engagements, and anniversaries. All this information may be displayed to the servers and managers on their smart watches when receiving a push notification. Based on this information, the staff may already have items prepared and waiting for the customer upon their arrival, such drinks, appetizers, or other items specifically for the customer, based on the customer preference information shown on their smart watch.

In other aspects of the invention, a social component is provided whereby a customer can add their friends or other dining partners to the dining experience by providing a profile for their dining partners. This profile can include the same information as the customer profile, including dietary restrictions, and other information that can be used to improve the dining experience. These profiles will also be available to the restaurant staff so that the staff is aware of and can prepare for these restrictions and other information.

Additionally, the customers will be able to provide a rating for their experience immediately after receiving their service. This data will populate under the management administration portal, for use by restaurant managers. Poor ratings from a customer sent for the restaurant will send a PUSH notification to the manager, who will be able to make decisions on how to rectify the issue.

On the restaurant host's interface may be a floor plan of the tables currently in process. The tables may be color coded based on where the customer currently is in the dining experience. For example, they may be just recently seated, ordering, in the process of eating, or ready to pay, etc. The restaurant hosts will be able to see the customer profile including dietary restriction and special events. The hosts can see all the servers and the tables that they are serving. They can also see the statuses of those tables. The system will show the history of the customer's status, and provides restaurants with customer's dining cycle from beginning to end. Additionally, the hosts will get automatically notified when a party is late and/or not in the proximity yet. This will allow the host to send a text to the party, in order to remind them of their table, and update their status.

In one embodiment of the present general inventive concept, the servers and managers are able to check into their shift and see their tables and pending notifications. Once checked in, they are eligible to be assigned tables by the host. The servers and food runners can see changes in status regarding the customers, and can read messages sent from the customers. The manager will receive PUSH notifications, when the customer sends a notification to the manager. In order to expedite the ordering process, the servers can see pre-orders made by the customer, prior to the customer being seated. The servers will also be able to see an image of the customer's profile, which may include dietary restrictions and special events such as birthdays and anniversaries. The servers will be able to see special accommodations and requests from customers. These may include, for example, booths request, seating arrangements, child seats, etc. The manager will see an image of all active servers and the tables they are serving.

A login screen may be provided where the user can enter his/her login information and password. A first user screen can show a selection of different restaurants within the user's local area, with estimated wait times listed for each restaurant. The interface may also show a graphical depiction of cost, nationality, and type of food typically served at the restaurant. Additionally, a rating figure, depicting other user's impression of the restaurant can be utilized. Based on the information shown in the user interface, the user may then select a restaurant and book a reservation based on the restaurant's availability.

The user may also search for restaurants base on various criteria. For example, they may search by highest rated, lowest price, or wait times for the restaurant. They may also search based on specific cuisine available at the restaurant. The user interface may also show a map of the user's local area, showing the location of various restaurants depicted on the map.

Once a decision has been made, the user may specify the party size and book the restaurant. The user is able to request getting in line on the waitlist, and the restaurant will hold the customer's position in the queue. This transaction will notify the restaurant of the customer's exact GPS location in order to populate a general ETA. A current wait time may be provided, and the restaurant may also specify a time for the customer to be at the restaurant in order to not lose their place in line. The user may also be given the option to make a reservation at a particular date and/or time. Once the customer books the restaurant the interface may request information regarding the dining event. For example, whether is it for a birthday, anniversary, date, or night out with friends. The customer will also be given the opportunity provide more specifics regarding their requirements, such as a booster seat for children, etc. In some embodiments, in order to minimize contact with a server and/or food runners, the customer can specify that the food is placed on the table prior to seating.

In some embodiments, the user will have the option to check in manually, or be automatically checked in based upon their GPS location in proximity to the restaurant. At this point, a server may be assigned, with an image of them showing up on the customer's smart watch. The customer will also be given the option to pick a preferred server of their choosing, and this may be a virtual or contactless server, at the customer's discretion, as described above. The customer will also have access to the menu on their smart phone, further expediting the dining process. The user interface in the figure shows both a contact manager and contact server selection. The customer can send out a notification from the application on their smart phone to get the manager's attention. This may be the case for an issue with the service, etc., where management intervention would be desired. This will trigger a PUSH notification, which will show up on the manager's interface. The customer may also send out a notification from the application to get the server's attention, in order to pay the bill, place an order, get additional condiments, or other issue. Each of these requests may be represented as a single push button option on the interface. This action will trigger a PUSH notification to the server's interface.

Icons representing each of the customers may contain various information regarding their dietary preferences and other personal information, which are relevant to the dining experience, such as celebrating a birthday or anniversary. This information will be provided to the server and manager when they receive the PUSH notification. Once the dinner is complete, the customer can rate their experience on the user interface and the data will populate a manager admin portal. Additionally, any poor ratings may generate a PUSH notification to the manager, which could be stimulate corrective action, if possible, by the restaurant.

In one embodiment of the present general inventive concept, various user interface screens may be available to the restaurant hosts. In the Floor Plans screen, the host can see a list of customers that are already seated, and the list of customers with reservations. The screen may also show the table positions and the table assigned to the customers. The tables and icons next to the customers may be color coded based on where the customer is in the dining experience. For example, John Doe may have a red icon next to his name, which may represent that he is late for his reservation. His assigned table may also be showing as red. Jane Roe may have a pink icon next to her name, which may represent that she has been recently seated. The Floor Plan screen may also show the number of persons assigned to each party.

An Add Table screen may show a list of the available tables on the left with a party waiting to be seated at a table. That screen also shows the number of persons the table may accommodate and the number of persons in the waiting party. This allows the host to align the most appropriate table for the customer waiting in line. In the Servers screen, the host can see the manager and servers, and the tables they are serving. It also shows the status of the table.

A Profile screen may show the history of the customer's status and provides the restaurant with the customer's dining cycle, from beginning to end. For example, in one screen, a customer Jane Roe may be highlighted. Her timeline can be shown with booking confirmation time, modification to booking, and seating time. Her booking can be annotated with specific personal information, such as an anniversary, and requirements, such as a gluten allergy and 2 high chairs required. Additionally, she may add a comment during booking requesting that, for example, a cake be brought out. Billing information can be shown on the bottom of the screen, and contact information may be listed, in case the host has to contact the customer.

A Bookings screen may show the customers on the wait list and also customers who have reservations. The screen may also show special events and large parties. A Pop-up screen can notify the host when a party is late or is not in proximity yet. This will allow the host to send out a text or push notification to that particular party.

In the Landing screen in one embodiment of the present general inventive concept, the servers and managers can check into their shift to see their tables and current notifications, making them eligible to be assigned tables by the host. In a server Message screen, the server can see his/her table assignment and any pending messages from a customer.

In a Tables screen, the servers can see their current customers and the number of people with the party. By clicking on a particular table, the server can see the customer's pre-orders, customer info, and any special requests. For example, the server can see that the customer has already ordered drink and starters prior to their being seated. The server can see that the customer has a birthday, is gluten free, and other customer information. Finally, the server can see the specific requests made by that customer.

An additional screen my show the managers messages, including a text from a customer requesting the manager's attention. The manager may also have screens analogous to the server's screens regarding customer information and special requests from the customer.

In an additional screen, an alert message may be shown, advising the server that it is time to place their smart watch on the charger.

FIG. 1A shows a flow chart of multiple user interface states on an iPad Application, according to one embodiment of the present general inventive concept. The first is a Login interface where various information is entered to check a user's credentials. In a second interface, a Host Checked In state shows various customers that are checked in and table configurations. By selecting an icon of the Host Checked In interface, a Waiting inline screen shows a list of waiting customers. By selecting a separate icon of the Host Checked In interface, a Seated interface shows a list of seated customers and the table they are located at. By selecting a further separate icon of the Host Checked In interface, a Servers interface shows a list of active and inactive servers available. In an additional Answer a Call interface, the server will be able to select an icon to answer a call from a customer, which might be, for example, to place an order or to pay. In a Phone Call Menu interface, a menu can be sent to a customer so that the customer can place an order from items on the menu. If the customer requests a check, the server can provide the total by selecting that icon in the Send Check state and await payment during the Waiting for customer to pay state. After the customer pays, an icon for send order will show up in the Send order to kitchen state. A Customer Check in interface provides for customer check in. A Wait time Settings interface and Select Zone interface allows the staff to set these options for the customer. Finally, an End Service interface terminates service for a particular customer.

Although the Point of Sale (POS) functionality may be tied to the iPad application, in one embodiment of the present general inventive concept, the POS functionality will not be tied to the iPad application, but rather will utilize the standard POS system. This will simplify the system such that no integration will be necessary.

Figure 2A:
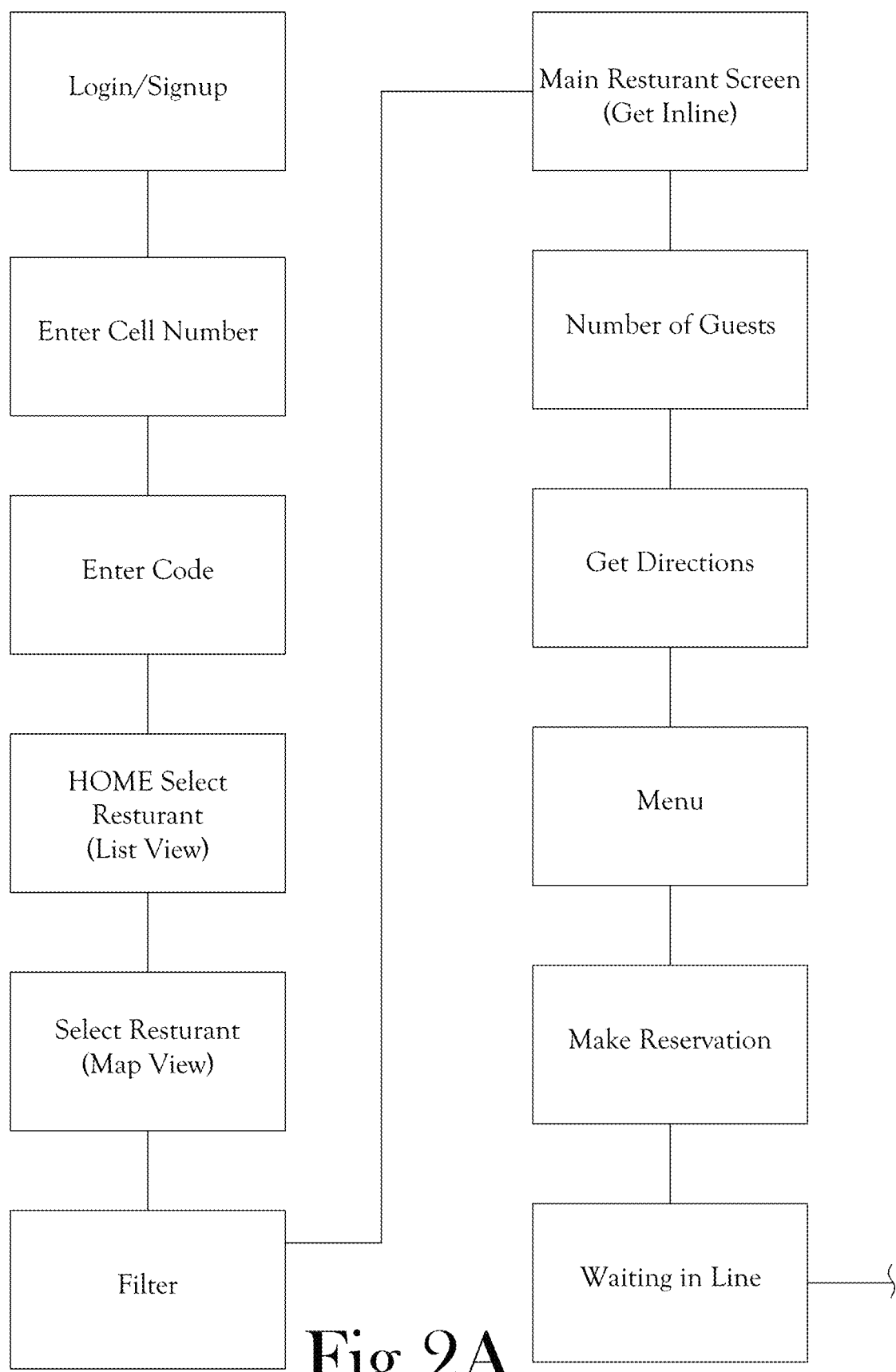
FIGS. 2A and 2B are flow charts of the functionality of the Restaurant Control Process according to an example embodiment of the present general inventive concept.
Figure 2B:
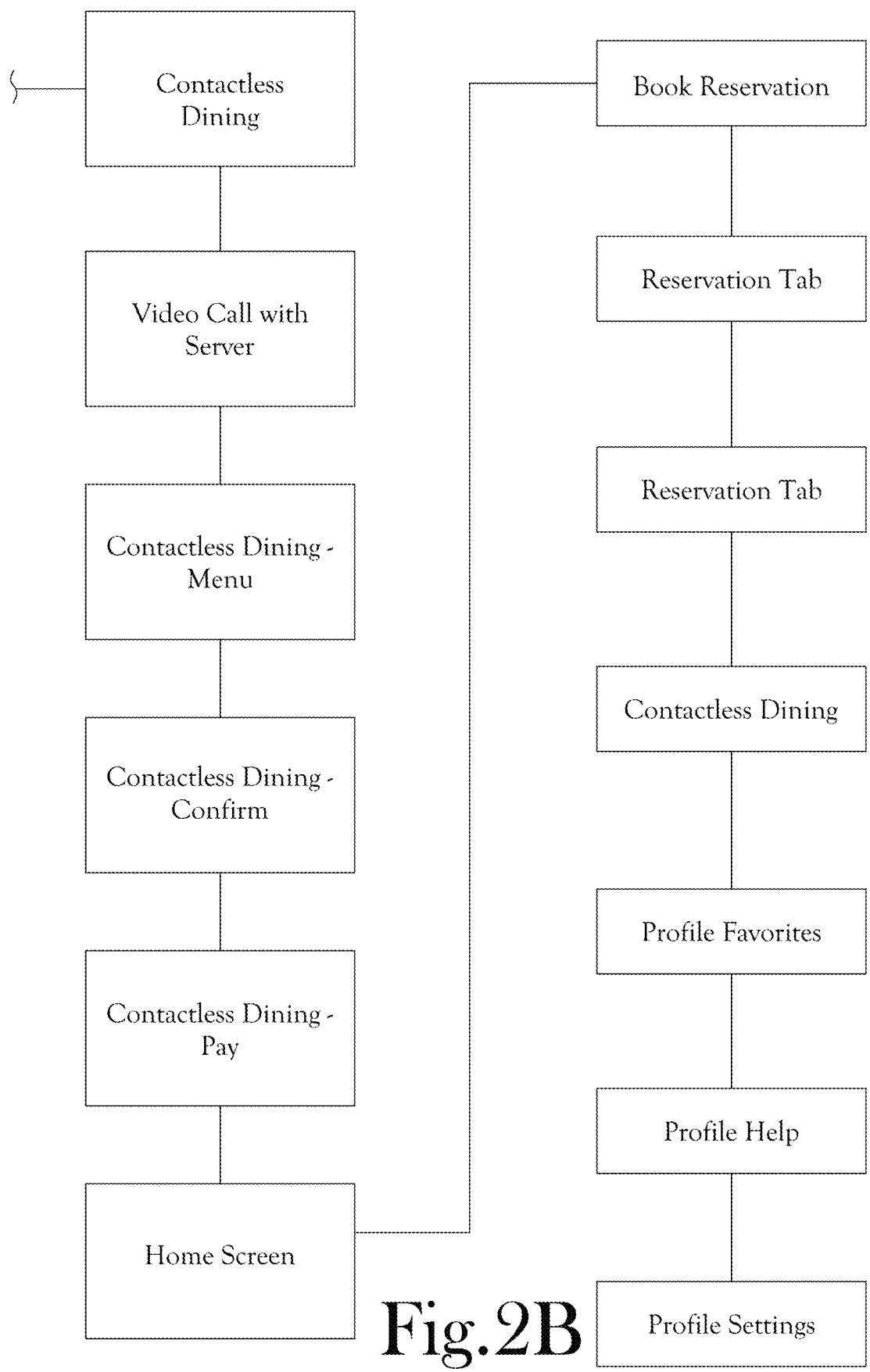
Figure 2C:
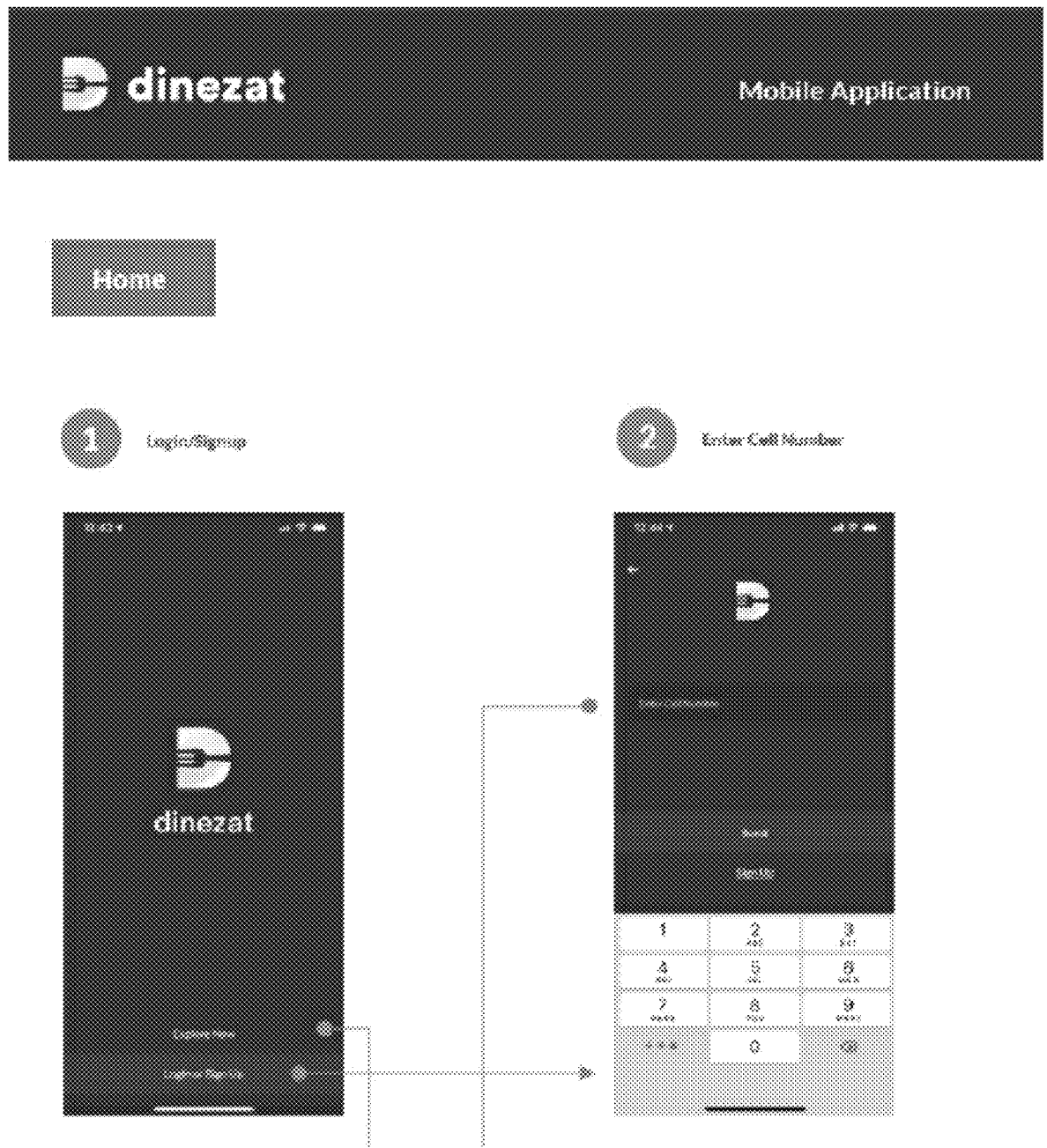
FIGS. 2C-2J show various user interfaces of the Restaurant Control Process according to an example embodiment of the present general inventive concept.
Figure 2D:
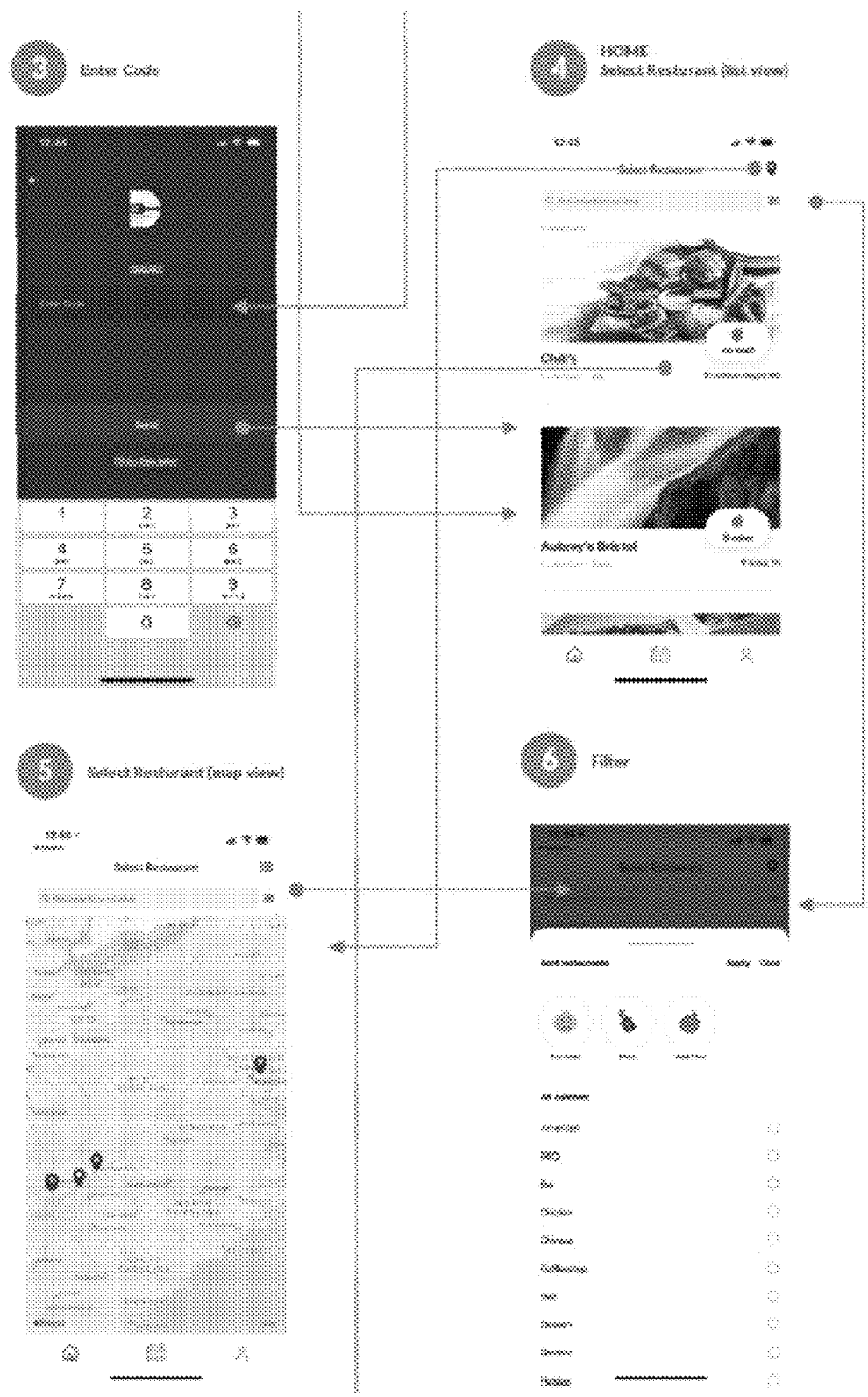
Figure 2E:
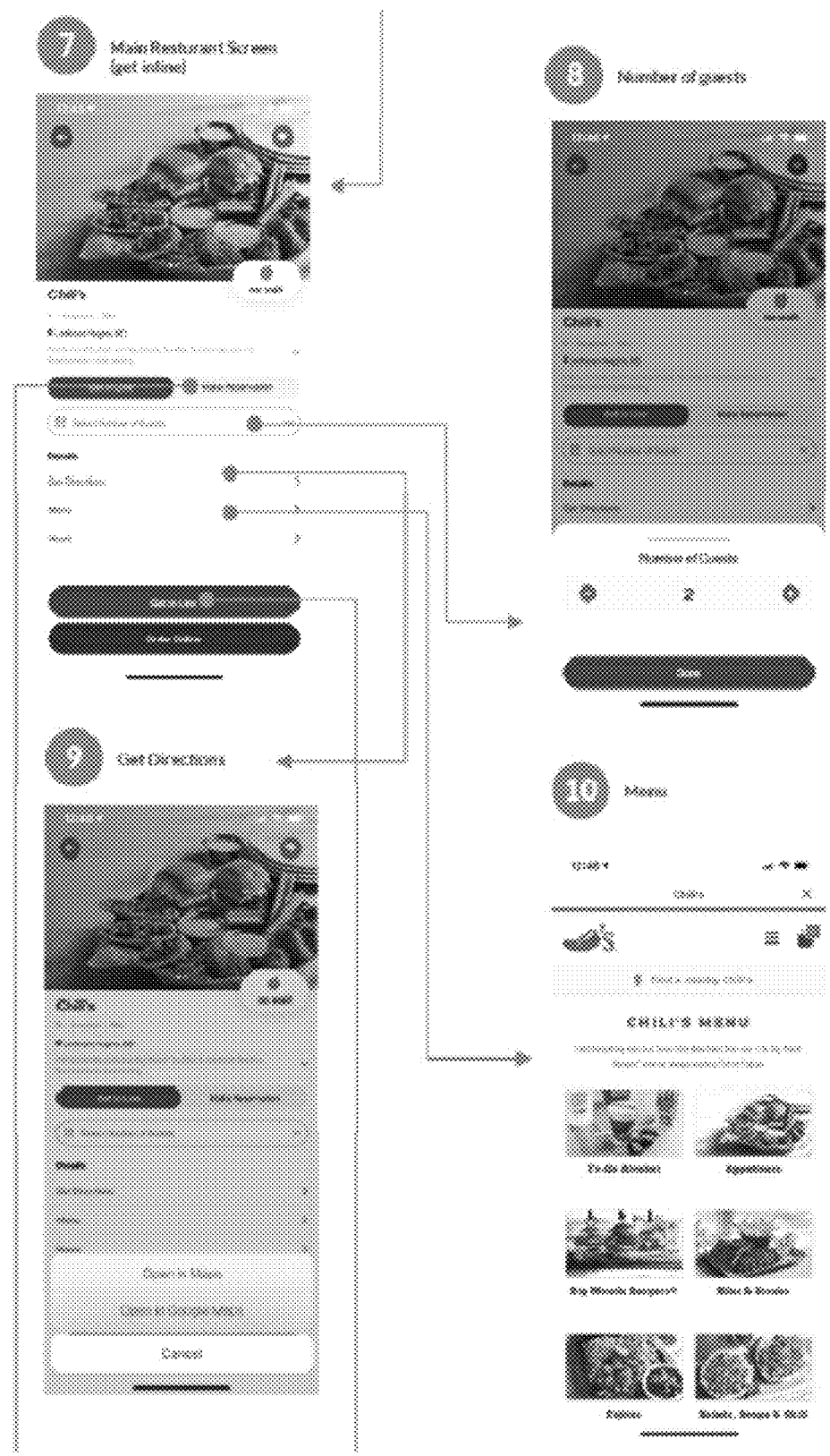
Figure 2F:
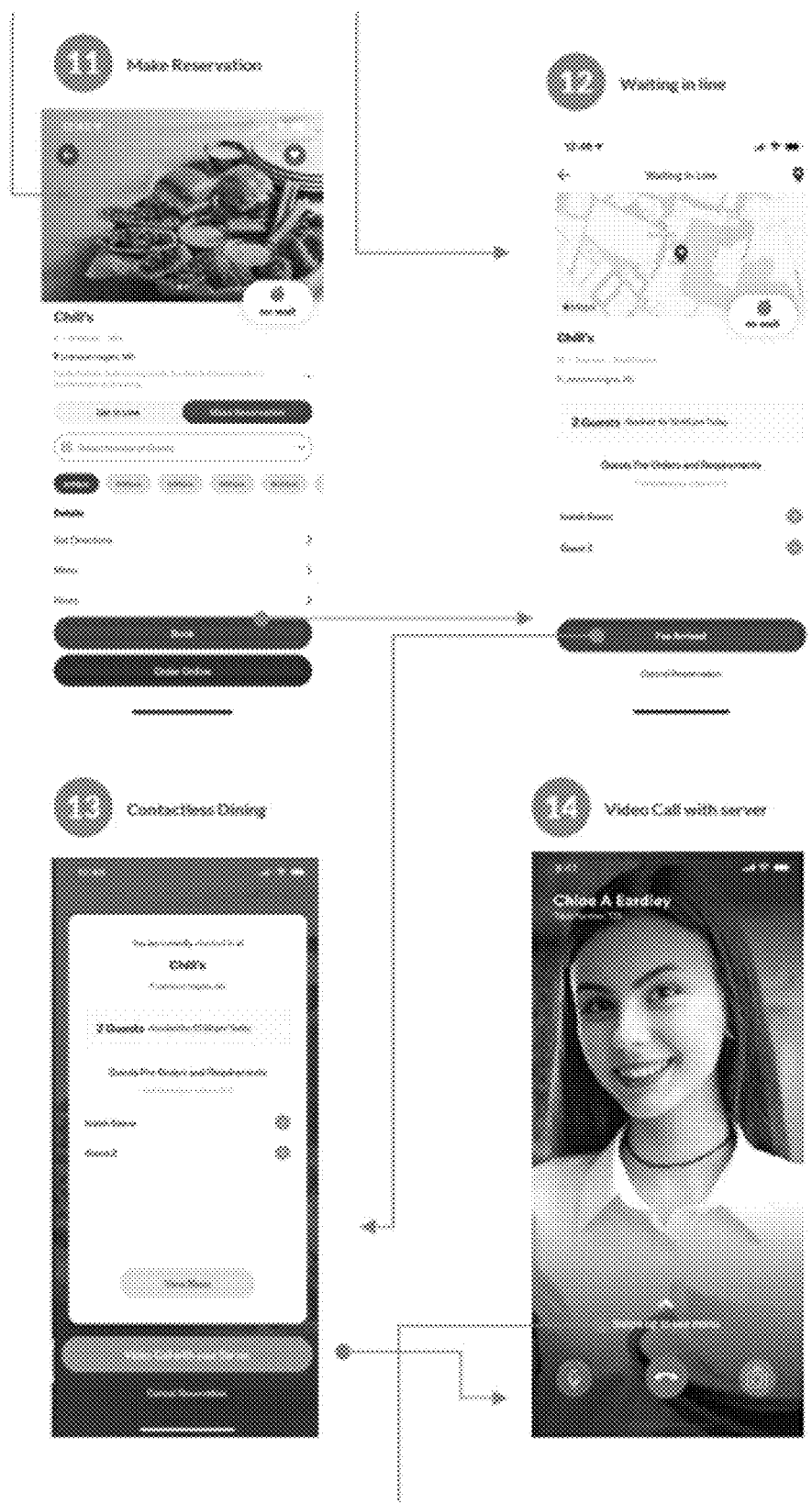
Figure 2G:
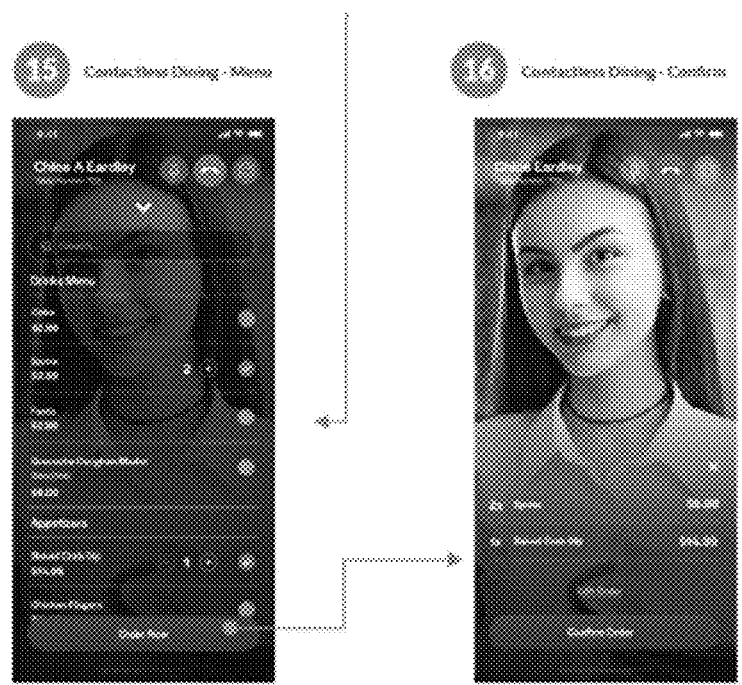
Figure 2G:
Figure 2G:
Figure 2H:
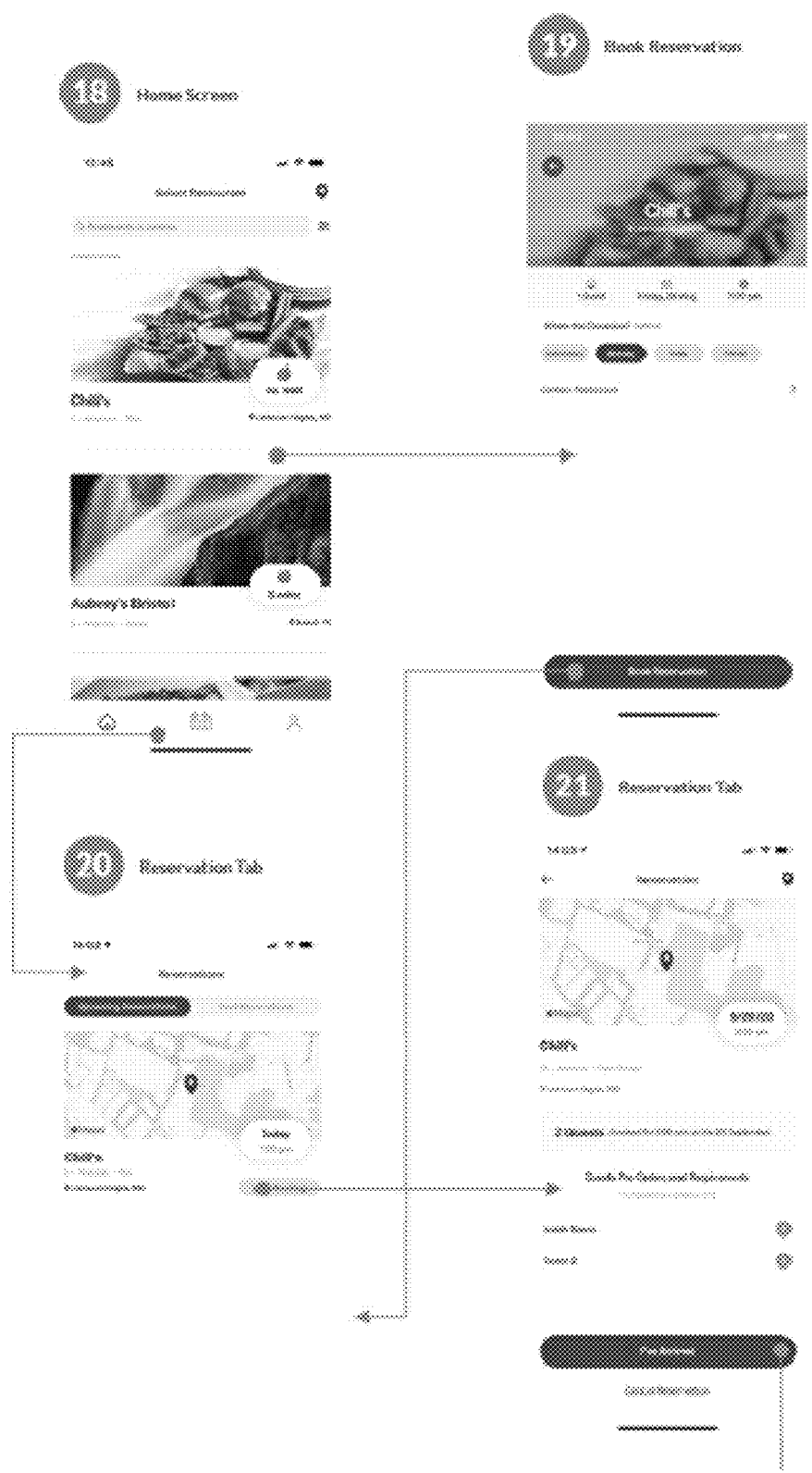
Figure 2I:
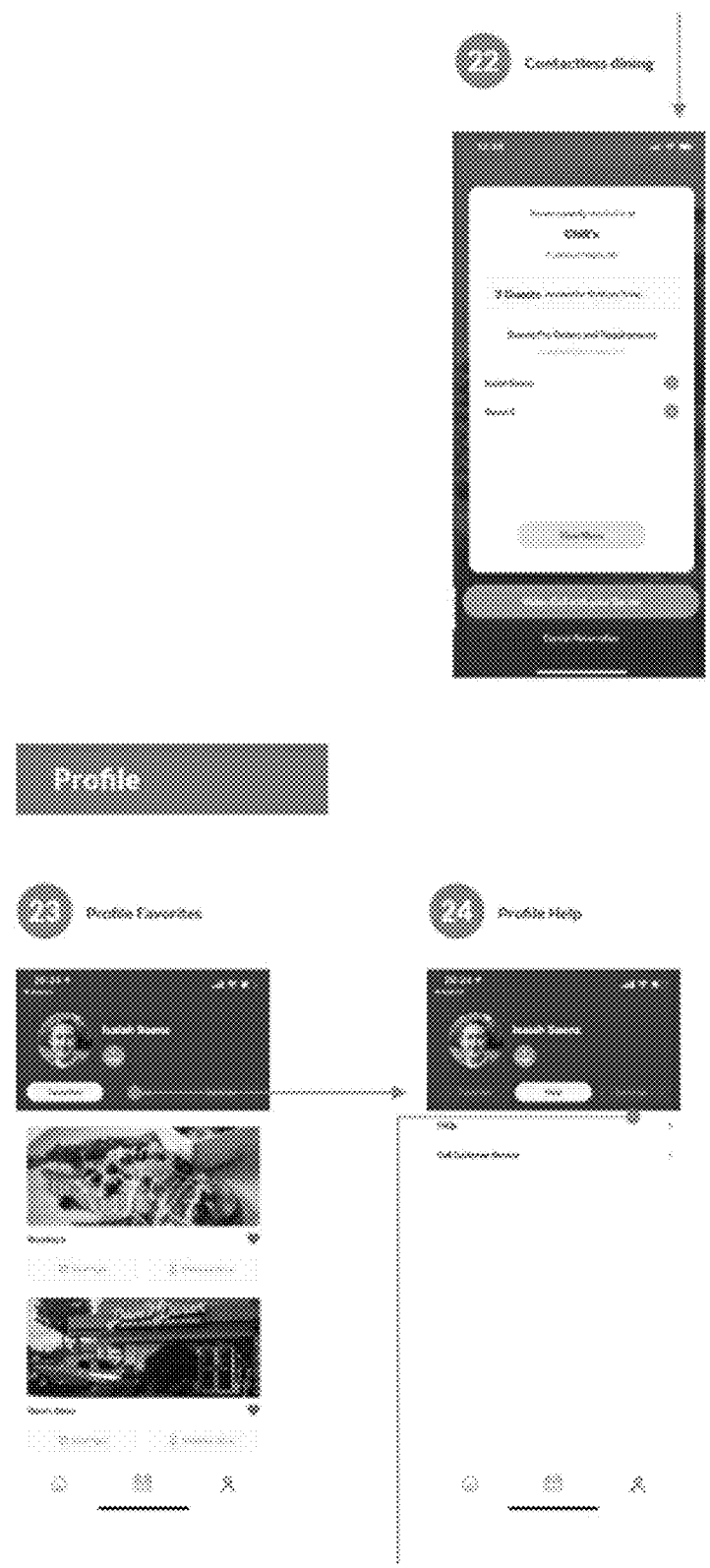
Figure 2J:
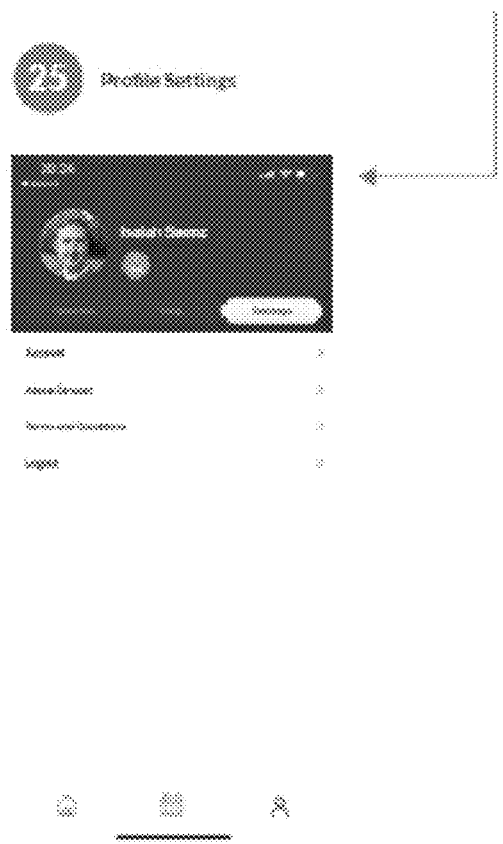

FIGS. 2A and 2B show a flow chart of multiple user interface states on a mobile device application, according to one embodiment of the present general inventive concept. In the first three interfaces are login or sign up screens where the customer can enter cell number and a code. In the Home interface a customer can select from a number of restaurants. These might be in list view or map view. The customer might further be able to filter the choices based on ratings, price, wait time, cuisine, among other choices. Once a restaurant is selected, the user is directed to a Main Restaurant Screen. Here, they will have the option of getting in line at the restaurant or making a reservation.

If the customer chooses the getting in line option from the Main Restaurant Screen, they may be able to select number of guests, get directions, view menu and hours, or order online. In a separate screen, the customer will be able to see the restaurant menu. From the Waiting in line screen, they will be able to specify that they have arrived at the restaurant, and the virtual server experience as described above, can begin. In the virtual server interface, the customer can complete pre-orders or to-go orders, include requirements, view menu, establish a video call with the server, cancel the reservation, place and order, and pay for the meal, among other possible options. If the customer chooses the Make Reservation option from the Main Restaurant Screen, the flow will direct to a Book Reservation screen. From here, they can select the number of guests, date and time of arrival, and the occasion. A Reservation Tab will show upcoming and past reservations, and from here they can navigate to a particular booking. After selecting a particular booking they can specify their arrival, where the flow reverts to Contactless Dining as described above.

Other user interfaces in addition to the ones described above may also be provided to the customer. In a set of further interfaces, the customer can see Profile Favorites, Profile Help, and can modify their Profile Settings.

Figure 3A:
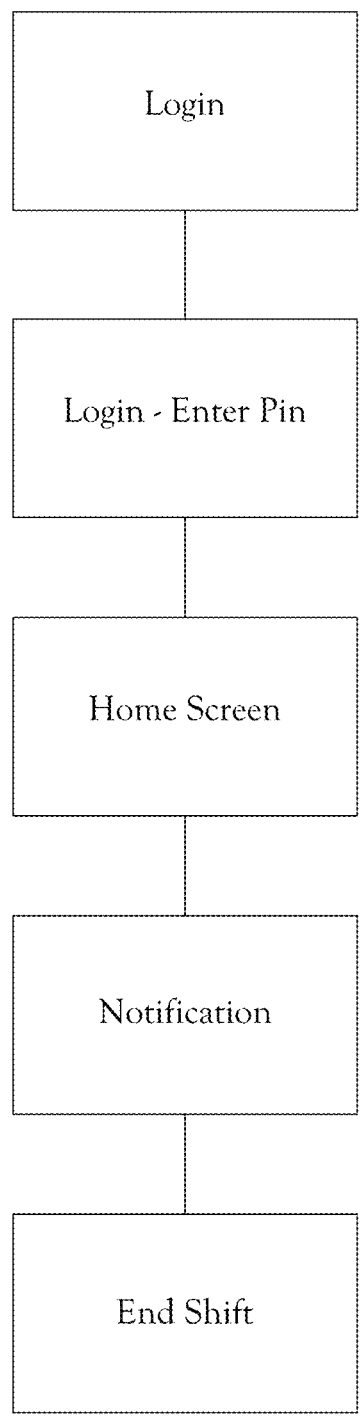
FIG. 3A is a flow chart of the functionality of the Restaurant Control Process according to an example embodiment of the present general inventive concept.

FIG. 3A shows a flow chart of multiple user interface states on a watch application, according to one embodiment of the present general inventive concept. In the first Login Screen, the restaurant staff member may select the Login option where the staff member is directed to a second screen to enter their pin number. After being recognized successfully, they are directed to a Home Screen. At the Home Screen, they will be able to see their notifications, for example, a table assignment, check request, or request to serve a customer. In the Notification screen state, they will be able to end the service. At the End Shift state, they will be able to end their shift.

FIGS. 1B-1E show various user interface screens on a tablet Application, according to one embodiment of the present general inventive concept.

FIGS. 2C-2J show various user interface screens on a Mobile Application, according to one embodiment of the present general inventive concept.

Figure 3B:
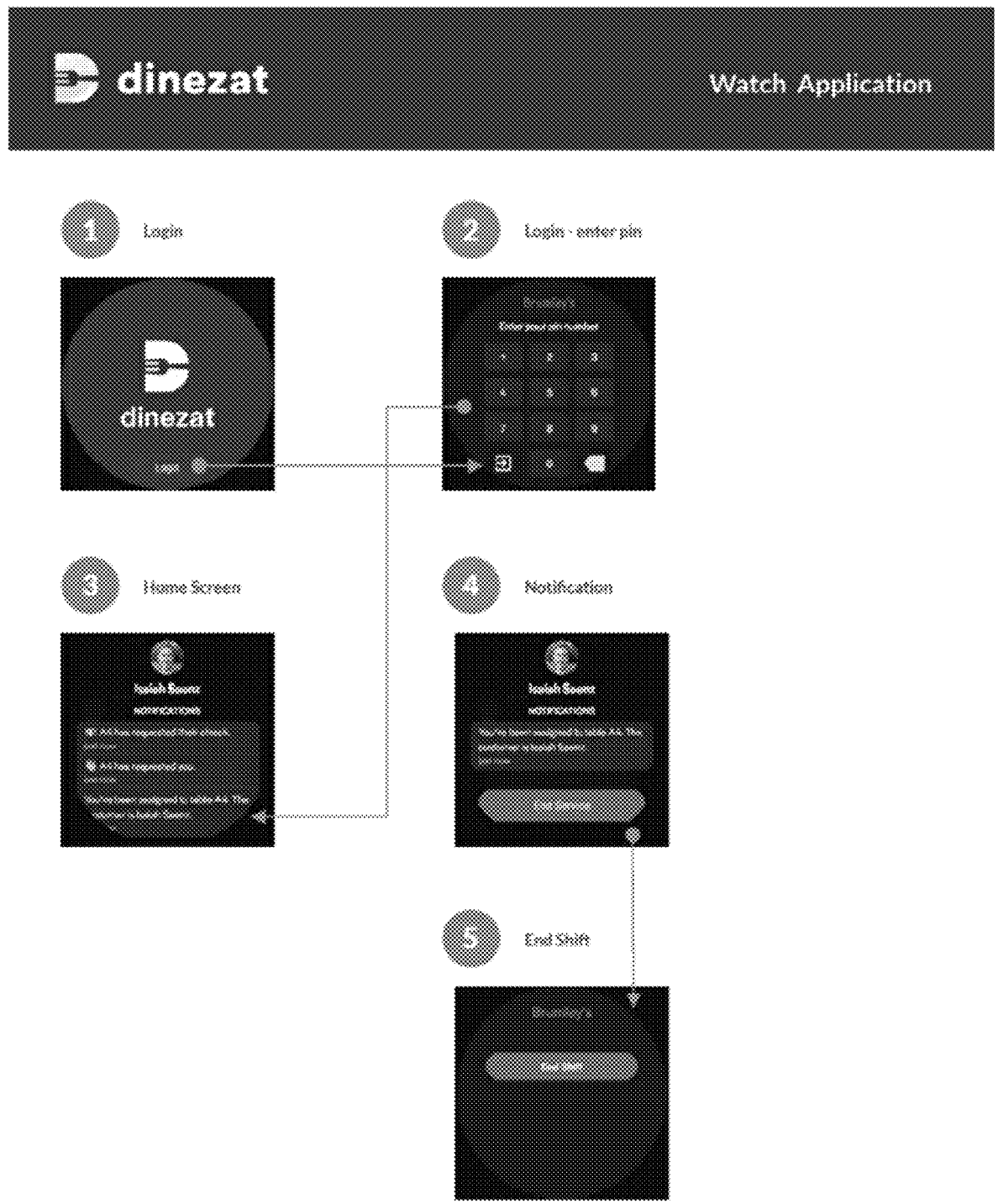
FIG. 3B shows various user interfaces of the Restaurant Control Process according to an example embodiment of the present general inventive concept.

FIG. 3B shows various user interface screens on a Watch Application, according to one embodiment of the present general inventive concept.

While various aspects of the invention are described, it will be apparent to those of ordinary skill in the art that other embodiments and implementations are possible within the scope of the invention. Accordingly, the invention is not to be restricted except in light of the attached claims and their equivalents.

Having thus described the aforementioned invention, what is claimed is:

1. A customer relations management method for streamlined dining, comprising:
   providing a software application configured to be used by restaurants that collects data regarding customer dining experiences;
   storing the data gathered during the customer dining experiences within a database;
   providing a customer mobile device of a restaurant customer, said customer mobile device being adapted to provide GPS-based physical location data indicating a physical location of the mobile customer device;
   providing a customer user interface configured for use on the customer mobile device which provides selections for restaurant choices and customer preferences;
   providing at least one user interface configured for use on an electronic device of a restaurant manager or staff which tracks tables and provides an interaction with customers;
   tracking the physical location of the customer mobile device by means of GPS-based physical location data provided by customer mobile device after the restaurant customer selects the restaurant via the customer user interface on the customer mobile device, automatically without human intervention checking in the restaurant customer based on the tracked physical location from the customer mobile device once the customer mobile device enters an area within a set distance from the restaurant, and automatically without human intervention communicating check-in information to the software application;

providing a charging system for charging the electronics device of the restaurant manager or staff; and performing analytics on the data stored during the customer dining experiences;

wherein the customer user interface provides an option for contactless dining, wherein the customer user interface provides an option for food to be delivered to a table of the restaurant customer prior to arrival, and including providing no more than two servers and delivering food with separate food runners.

2. The customer relations management method according to claim 1, including providing a customer rating option.

3. The customer relations management method according to claim 1, wherein the electronics device of the restaurant manager or staff comprises a smart watch.

4. The customer relations management method according to claim 1, wherein the customer user interface provides an option for the customer to order food through the customer user interface after the customer has arrived at a table.

* * * * *